United States Patent Office 2,939,819
Patented June 7, 1960

2,939,819

21-ALKYL - 17β-HYDROXY - 17α - PREGN-20-YNES, THERAPEUTIC COMPOSITIONS COMPRISING SAME, AND PROCESS THEREFOR

Suzanne Patricia Barton, Derek Burn, George Cooley, Bernard Ellis, Vladimir Petrow, and Isobel Ann Stuart-Webb, all of London, England, assignors to The British Drug Houses Limited, London, England, a British company No Drawing. Filed Jan. 21, 1958, Ser. No. 710,200

Claims priority, application Great Britain Jan. 25, 1957

12 Claims. (Cl. 167—65)

This invention is for improvements in or relating to organic compounds and has particular reference to the preparation of 21-alkyl derivatives of 17β-hydroxy-17α-pregn-20-ynes, which are of value on account of their progestational properties or as intermediates in the preparation of compounds with useful progestational properties.

It is an object of the present invention to provide pharmaceutical and veterinary preparations of new 21-alkyl derivatives of 17β-hydroxy-17α-pregn-20-ynes.

According to the present invention there are provided 21-alkyl derivatives of 17β-hydroxy-17α-pregn-20-ynes having the general formula

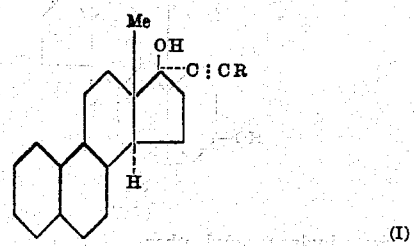

(I)

where R is an alkyl group containing from 1 to 8 carbon atoms. In particular, the invention provides new 21-alkyl derivatives of 17β-hydroxy-17α-pregn-20-yne having the general formula

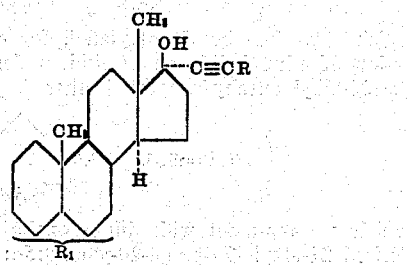

where R is an alkyl group containing from 1 to 4 carbon atoms, and $R_1$ is selected from the group consisting of

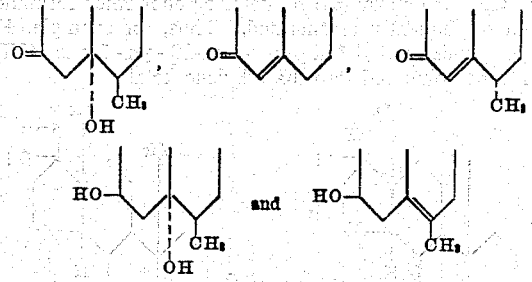

The new compounds may be 21-alkyl derivatives of 17β-hydroxy-17α-pregn-4-en-20-yn-3-one, and 17β-hydroxy-6-methyl-17α-pregn-4-en-20-yn-3-one.

The present invention provides the specific new compounds

3β:17β-dihydroxy-21-methyl-17α-pregn-5-en-20-yne,
3β:17β-dihydroxy-21-ethyl-17α-pregn-5-en-20-yne,
6β:21-dimethyl-17α-pregn-20-yne-3β:5α:17β-triol,
5α:17β-dihydroxy-6β:21-dimethyl-17α-pregn-20-yn-3-one,
21-ethyl-6β-methyl-17α-pregn-20-yne-3β:5α:17β-triol,
5α:17β-dihydroxy-21-ethyl-6β-methyl-17α - pregn-20-yn-3-one and
6:21-dimethyl-17α-pregn-5-en-20-yne-3β:17β-diol which are of value as intermediates in the preparation of compounds with useful progestational properties.

The present invention also provides the specific new compounds:

17β-hydroxy-21-methyl-17α-pregn-4-en-20-yn-3-one,
17β-hydroxy-21-ethyl-17α-pregn-4-en-20-yn-3-one,
6α:21-dimethyl-17β-hydroxy-17α-pregn-4-en-20-yn-3-one,
21-ethyl-17β-hydroxy-6α-methyl-17α-pregn-4-en - 20-yn-3-one which are of value on account of their progestational properties. 6α:21-dimethyl-17β-hydroxy-17α-pregn-4-en-20-yn-3-one and 21-ethyl-17β-hydroxy-6α - methyl - 17α-pregn-4-en-20-yn-3-one, are particularly noteworthy in this respect being found to be circa 12 and circa 9 times more effective than is ethisterone when administered by the oral route in the Clauberg assay. They consequently find application in the treatment of symptoms arising from the syndrome known as premenstrual tension. They may also be used to counteract the over-oestrinisation occurring in patients with persistent menorrhagia and to ensure establishment of normal progestational effects in the uteri of women suffering from secondary amenorrhoea.

According to the present invention there is further provided a process for the preparation of 21-alkyl derivatives of 17β-hydroxy-17α-pregn-20-ynes having the general formula (I)

from 17β-hydroxy-17α-pregn-20-ynes having the general formula (II)

which process comprises protecting the 17β-hydroxyl group of the 17β-hydroxy-17α-pregn-20-yne by converting it into an ether, alkylating at the $C_{21}$ position the ethynyl group and regenerating the 17β-hydroxyl group to give the 21-alkyl derivative (I).

Protection of the 17β-hydroxyl group in compounds of the general Formula II may be conveniently effected by condensation with vinylic ethers such as, for example, isopropylvinyl ether or 2:3-dihydropyran. 2:3-dihydropyran is the preferred reactant as it is available commercially.

Condensation of compounds of the general Formula II with 2:3-dihydropyran to give tetrahydropyranyl ethers of general formula

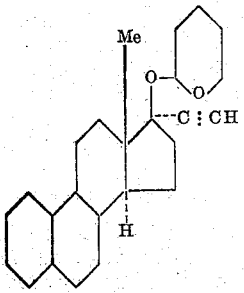

(III)

may conveniently be effected by mixing the compound of Formula II with an excess of 2:3-dihydropyran, preferably in an organic solvent such as chloroform or tetrahydrofuran and in the presence of a catalytic quantity of an acidic reagent such as, for example, hydrochloric acid or phosphorus oxychloride. Purification of the resulting tetrahydropyranyl ether of general Formula III is generally unnecessary and the crude material may be used directly for the next stage of the process.

21-alkylation of the tetrahydropyranyl ether of general Formula III may be achieved by converting compound III into a $C_{21}$-metallic derivative and condensing the latter with e.g. an alkyl halide or sulphate to give the 21-alkylated tetrahydropyranyl ether of general formula

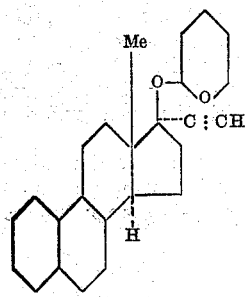

(IV)

Lithium, sodium and potassium derivatives of the compound III are very suitable for this purpose. Their formation is readily effected by adding the compound III to a solution of the metal amide in liquid ammonia. Thus, for example, the compound III may be dissolved in a solvent such as ether and the solution added to lithamide, sodamide or potassamide in liquid ammonia when conversion to the metal derivative takes place. An alkyl halide, such as for example, ethyl bromide or iodide, is then added to the solution when the 21-alkylated tetrahydropyranyl ether (IV) is obtained.

Regeneration of the 17β-hydroxylic group from compound IV to give the desired 21-alkyl derivative of a substituted 17β-hydroxy-17α-pregn-20-yne may be effected by methods well known to those skilled in the art. Thus, for example, regeneration of the 17β-hydroxylic group may be accomplished by treating the 21-alkylated tetrahydropyranyl ether with an acidic reagent, such as for example hydrochloric acid, toluene-p-sulphonic acid or oxalic acid in a solvent such as ethanol either at room temperature or under reflux conditions depending upon the nature of the substituents in the 21-alkylated tetrahydropyranyl ether.

The process of the invention may be applied to 17β-hydroxy-17α-pregn-20-ynes (I) containing a variety of substituents and unsaturated linkages in the molecule as will be apparent to those skilled in the art. Such substituents may include, for example, oxo-, hydroxyl- (additional to the hydroxyl group at $C_{17}$), phenolic-hydroxyl-, and methyl-groups. By way of examples, methods for dealing with such additional unsaturated linkages and substituents will be outlined below:

(i) Isolated unsaturated linkages such as, for example, at 9:11. These do not interfere, in general, with the process of the invention.

(ii) Methyl groups, such as, for example, Me groups at $C_2$, $C_6$, $C_{16}$. These do not interfere, in general, with the process of the invention.

(iii) Hydroxyl groups such as for example, hydroxyl groups at $C_5$, $C_6$ and $C_{11}$ and phenolic hydroxyl-groups. These are conveniently protected by conversion into the tetrahydropyranyl ethers concurrently with the conversion of the 17β-hydroxyl group (see Formula II) into the tetrahydropyranyl ether (see Formula III), and subsequently regenerated. Thus, for example, 6β-methyl-17α-pregn-20-yne-3β:5α-17β-triol (V) may be converted into the

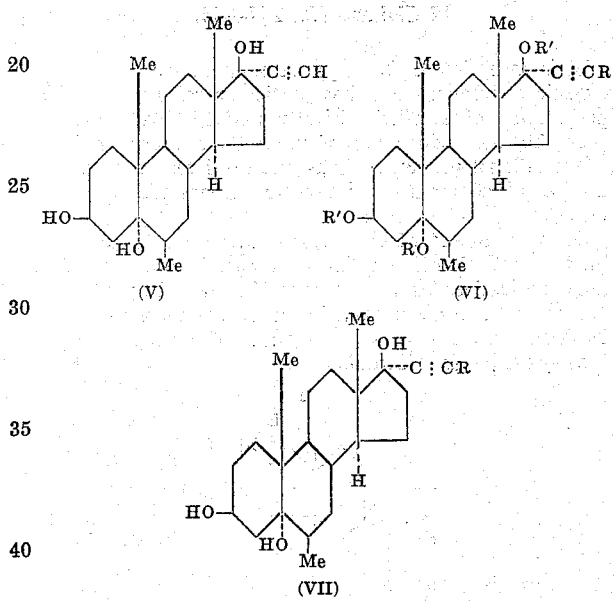

tritetrahydropyranyl ether

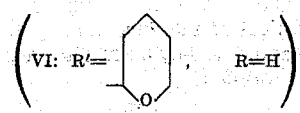

which may then be $C_{21}$-alkylated, for example by the action of ethyl iodide on its lithium derivative to give the 21-alkyl tetrahydropyranyl ether

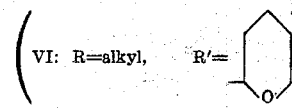

which on treatment with dilute oxalic acid yields the desired 21-alkyl-17α-pregn-20-yne-3β:5α:17β-triol (VII.) (R=alkyl).

(iv) Oxo-groups: Oxo-groups may conveniently be protected, for example by ketal or enol ether formation, and subsequently regenerated. Thus, for example, 17β-hydroxy-6α-methyl-17α-pregn-4-en-20-yn-3-one (VIII) may be converted into the ethylene ketal

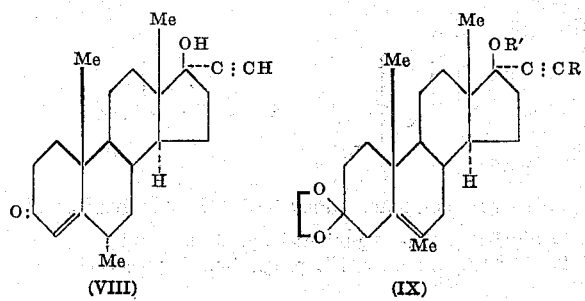

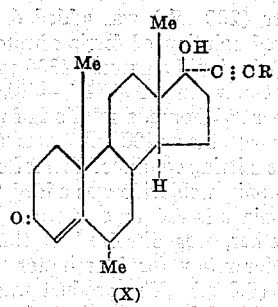

(IX; R=R'=H), which may then be condensed with 2:3-dihydropyran to give the ketal tetrahydropyranyl ether

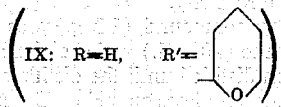

The last compound is then alkylated to give the 21-alkyl derivative

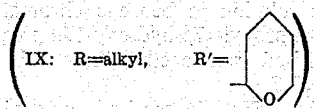

Treatment of this material with dilute ethanolic oxalic acid leads to regeneration of the 17β-hydroxyl group and 3-oxo group to give the desired 21-alkyl-17β-hydroxy-6α-methyl-17α-pregn-4-en-20-yn-3-one (X) (R=alkyl).

The invention also therefore provides a method for the preparation of 21-alkyl derivatives of 17β-hydroxy-17α-pregn-20-ynes having the general Formula I above where R is an alkyl group containing from 1 to 8 carbon atoms which method comprises converting a 17β-hydroxy-17α-pregn-20-yn-3-one into a 3:3-ethylenedioxy derivative, condensing the 3:3-ethylenedioxy derivative with 2:3-dihydropyran to give a 17β-tetrahydropyranyl ether of the 3:3-ethylenedioxy derivative, alkylating the 17β-tetrahydropyranyl ether to give a 21-alkyl derivative and treating the 21-alkyl derivative with dilute ethanolic oxalic acid to regenerate the 17β-hydroxyl group and 3-oxo group and give the desired 21-alkyl-17β-hydroxy-17α-pregn-20-yn-3-one.

Pharmaceutical preparations of certain of the new 21-alkyl-17β-hydroxy-17α-pregn-20-ynes (I) and in particular pharmaceutical preparations of 6α:21-dimethyl-17β-hydroxy-17α-pregn-4-en-20-yn-3-one and 21-ethyl-17β-hydroxy-6α-methyl-17α-pregn-4-en-20-yn-3-one may take the form of tablets, cachets, capsules, tablets for sublingual absorption, elixirs, injections and suppositories. The materials may be associated with solid or liquid carriers. The compositions may comprise the steroid admixed with compatible solid diluents and/or tableting adjuvants such, for example, as lactose, starch or magnesium stearate.

Following is a description by way of example of methods of carrying the invention into effect:

EXAMPLE 1

*17β-hydroxy-21-ethyl-17α-pregn-4-en-20-yn-3-one having the formula*

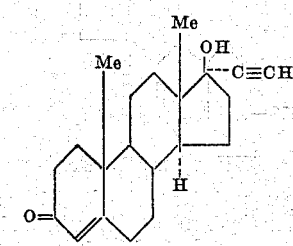

Where R=CH₃ (XI)

*Method (a).*—A solution of 3β:17β-dihydroxy-17α-pregn-5-en-20-yne (10 g.) in tetrahydrofuran (85 ml.) was mixed with 2:3-dihydropyran (25 ml.) followed by phosphorus oxychloride (0.2 ml.). After 2½ hours, the mixture was poured into water (2 l.) and the solids obtained, collected and crystallised from aqueous acetone containing a trace of pyridine. The 3β:17β-bis-tetrahydropyranyl ether of 3β:17β-dihydroxy-17α-pregn-5-en-20-yne had M.P. 173° to 174° C., $[\alpha]_D^{21}$ —120° (c, 0.61 in chloroform).

The foregoing compound (4.1 g.) in dry ether (165 ml.) was added dropwise over 1 hour to a stirred solution of ferric nitrate (0.2 g.) and lithium (0.45 g.) in liquid ammonia (110 ml.) maintained at a temperature between —35° C. and —40° C. After stirring for a further 2½ hours, a solution of methyl iodide (11 ml.) in dry ether (50 ml.) was added over 30 minutes and the stirring continued thereafter for a further 3 hours. Ammonium chloride (5 g.) was added to the mixture, and the ammonia allowed to evaporate. The product, isolated with ether, was triturated with methanol to give material with M.P. 120° to 125° C. This material (400 mg.) in ethanol (50 ml.) was treated with toluene-p-sulphonic acid (150 mg.) and the mixture heated for 30 minutes on the steambath. Concentration followed by the addition of water gave a solid which was purified from aqueous methanol. 3β:17β - dihydroxy - 21-methyl-17α-pregn-5-en-20-yne formed plates, M.P. 177° to 179° C., $[\alpha]_D^{20}$ —124° (c, 1.0 in chloroform).

The foregoing compound (1.2 g.) was dissolved in a mixture of toluene (100 ml.) and cyclohexanone (40 ml.) and the solution distilled until 30 ml. of distillate had collected. Aluminium isopropoxide (5 g.) in toluene (20 ml.) was added and the mixture heated under reflux for 1 hour. After washing with dilute sulphuric acid, the solvents were removed by steam-distillation and the product isolated with ether. Its solution in benzene was filtered through a short column of alumina. Purification from a mixture of equal parts of acetone and hexane gave 17β-hydroxy-21-methyl-17α-pregn-4-en-20-yn-3-one, in micro-needles, M.P. 150° to 151° C., $[\alpha]_D^{22}$ +11° (c, 0.53 in ethanol).

*Method (b).*—A solution of 17β-hydroxy-17α-pregn-4-en-20-yn-3-one (5 g.) in a mixture of benzene (110 ml.) and ethylene glycol (6 ml.) was distilled until the distillate was no longer turbid. Thereafter, toluene-p-sulphonic acid (0.1 g.) was added, and the mixture heated under reflux for 4 hours. The product which separated on cooling was crystallised from aqueous pyridine to give 3:3-ethylenedioxy-17β-hydroxy-17α-pregn-5-en-20-yne, in soft plates, M.P. 258° to 259° C., $[\alpha]_D^{25}$ —69° (c, 0.75 in pyridine).

The foregoing compound (3.8 g.) in tetrahydrofuran (200 ml.) was treated with 2:3-dihydropyran (10 ml.) followed by phosphorus oxychloride (0.08 ml.). After 2½ hours, the mixture was poured into dilute aqueous sodium bicarbonate solution, and the precipitated solids purified from aqueous acetone containing a trace of pyridine. The 17β-tetrahydropyranyl ether of 3:3-ethylenedioxy-17β-hydroxy-17α-pregn-5-en - 20 - yne had M.P. 170° to 174° C., $[\alpha]_D^{22}$ —92° (c, 0.77 in pyridine).

The foregoing compound (4 g.) in dry tetrahydrofuran (100 ml.) was added dropwise over 1 hour to a stirred solution of ferric nitrate (0.2 g.) and lithium (1.55 g.) in liquid ammonia (400 ml.) maintained at a temperature between —35° C. and —40° C. After stirring for a further 2¼ hours, a solution of methyl iodide (11 ml.) in dry ether (50 ml.) was added over 30 minutes and the stirring continued thereafter for a further 2¾ hours. Ammonium chloride (5 g.) was added to the mixture, and the ammonia allowed to evaporate. The product, isolated with ether, was triturated with ethanol to give material, with M.P. 145° to 146° C., which was purified from aqueous acetone containing a trace of pyridine. The 17β-tetrahydropyranyl ether of 3:3-ethylenedioxy- 17β-hydroxy-21-methyl-17α-pregn-5-en-20-yne formed needles, M.P. 148° to 149° C., [α]$_D^{22}$ —84° (c, 0.99 in pyridine).

The foregoing compound (200 mg.) in ethanol (20 ml.) was treated with 2% aqueous oxalic acid (10 ml.) and the mixture heated under reflux for 45 minutes. Dilution with an equal volume of water (30 ml.) gave a small quantity of crystalline material which was removed by filtration. Further addition of water to the filtrate gave plates, M.P. 100° C. to 104° C. which was purified from acetone/hexane. 17β-hydroxy-21-methyl-17α-pregn-4-en-20-yn-3-one separated in prismatic needles, M.P. 151 to 152° C., not depressed on admixture with a specimen prepared by Method (a) above.

EXAMPLE 2

*21-ethyl-17β-hydroxy-17α-pregn-4-en-20-yn-3-one*

(Formula XI) (where R=C$_2$H$_5$)

*Method (a).*—A solution of the 3β:17β-bis-tetrahydropyranyl ether of 3β:17β-dihydroxy-17α-pregn-5-en-20-yne (6 g.) (prepared as described in Method (a) of Example 1) in dry ether (100 ml.) was added dropwise over 1 hour to a stirred solution of ferric nitrate (0.3 g.) and lithium (1.1 g.) in liquid ammonia (200 ml.) maintained at a temperature between —35° and —40° C. After stirring for a further 2½ hours, a solution of ethyl iodide (21 ml.) in dry ether (100 ml.) was added over 30 minutes and the stirring continued thereafter for a further 3 hours. Ammonium chloride was added to the mixture, and the ammonia allowed to evaporate. The product, isolated with ether, was dissolved in ethanol (60 ml.) and heated under reflux for 30 minutes with toluene-p-sulphonic acid (0.6 g.) The product was isolated with ether and crystallised from acetone/hexane, when 3β:17β-dihydroxy-21-ethyl-17α-pregn-5-en-20-yne separated in fine needles, M.P. 78° to 80° C., [α]$_D^{22}$ —107° (c, 0.4 in pyridine).

The foregoing compound (1 g.) was dissolved in a mixture of toluene (80 ml.) and cyclohexanone (32 ml.) and the solution distilled until the distillate was no longer turbid. Aluminium isopropoxide (4 g.) in toluene (16 ml.) was added and the mixture heated under reflux for 20 minutes. The product was isolated in the usual way and its solution in benzene chromatographed on alumina. 21-ethyl-17β-hydroxy-17α-pregn-4-en-20-yn-3-one crystallised from acetone/hexane in plates, M.P. 118° to 120° C., [α]$_D^{23}$ +12° (c, 0.74 in ethanol).

*Method (b).*—The 17β-tetrahydropyranyl ether of 3:3-ethylenedioxy-17β-hydroxy-17α-pregn-5-en-20-yne, prepared as described in Method (b) of Example 1, was ethylated by a procedure similar to the methylation procedure described in Method (b) of Example 1, to give the 17β-tetrahydropyranyl ether of 21-ethyl-3:3-ethylenedioxy-17β-hydroxy-17α-pregn-5-en-20-yne, which crystallised from acetone containing a trace of pyridine, in needles, M.P. 120° to 121° C., [α]$_D^{21}$ —105° (c, 1.01 in pyridine).

The foregoing compound (2 g.) in ethanol (200 ml.) was heated under reflux with 2% aqueous oxalic acid (100 ml.) for 55 minutes. The product was isolated with ether and its benzene solution filtered through a column of alumina. 21-ethyl-17β-hydroxy-17α-pregn-4-en-20-yn-3-one crystallised from acetone/hexane in plates, M.P. 118° to 119° C., not depressed on admixture with a specimen prepared by Method (a) above.

EXAMPLE 3

*21-n-propyl-17β-hydroxy-17α-pregn-4-en-20-yn-3-one*

(Formula XI, where R=n-propyl)

*Method (a).*—A solution of the 3β:17β-bis-tetrahydropyranyl ether of 3β:17β-dihydroxy-17α-pregn-5-en-20-yne (8 g.) (prepared as described in Method (a) of Example 1) in dry ether (200 ml.) was added dropwise over 1 hour to a stirred solution of ferric nitrate (0.2 g.) and lithium (1.5 g.) in liquid ammonia (300 ml.) maintained at a temperature between —35° and —40° C. After stirring for a further 2¼ hours, a solution of n-propyl iodide (13.5 ml.) in dry ether (100 ml.) was added over 30 minutes and the stirring continued thereafter for a further 3 hours. Ammonium chloride was added to the mixture, and the ammonia allowed to evaporate. The product, isolated with ether, was dissolved in ethanol (80 ml.) and heated under reflux for 30 minutes with toluene-p-sulphonic acid (0.8 g.) The product was isolated with ether and crystallised from ether/petroleum ether, when 3β:17β-dihydroxy-21-n-propyl-17α-pregn-5-en-20-yne separated in fine needles, M.P. 70 to 71° C., [α]$_D$ —110° (c, 1.002 in chloroform).

The foregoing compound (1.2 g.) was dissolved in a mixture of toluene (100 ml.) and cyclohexanone (40 ml.) and the solution distilled until the distillate was no longer turbid. Aluminium isopropoxide (5 g.) in toluene (20 ml.) was added and the mixture heated under reflux for 20 minutes. The product was isolated in the usual way and its solution in benzene chromatographed on alumina. 21-n-propyl-17β-hydroxy-17α-pregn-4-en-20-yn-3-one crystallised from acetone/hexane in long prisms, M.P. 84 to 86° C.

*Method (b).*—The 17β-tetrahydropyranyl ether of 3:3-ethylenedioxy-17β-hydroxy-17α-pregn-5-en-20-yne, prepared as described in Method (b) of Example 1, was n-propylated by a procedure similar to the methylation procedure described in Method (b) of Example 1, to give the 17β-tetrahydropyranyl ether of 3:3-ethylenedioxy-17β-hydroxy-21-n-propyl-17α-pregn-5-en-20-yne, which crystallised from acetone containing a trace of pyridine, in needles, M.P. 104° to 106° C., [α]$_D^{25}$ —134° (c, 1.07 in chloroform).

The protective groupings present in the foregoing compound were removed with aqueous ethanolic oxalic acid under the conditions described in Method (b) of Example 2, to give 17β-hydroxy-21-n-propyl-17α-pregn-4-en-20-yn-3-one, which crystallised from acetone/hexane in dense prisms, M.P. 86° to 87° C., [α]$_D^{27}$ +8° (c, 0.72 in chloroform).

EXAMPLE 4

*21-n-butyl-17β-hydroxy-17α-pregn-4-en-20-yn-3-one*

(Formula XI, where R=n-butyl)

The 17β-tetrahydropyranyl ether of 3:3-ethylenedioxy-17β-hydroxy-17α-pregn-5-en-20-yne, prepared as described in Method (b) of Example I, was n-butylated and the crude product treated with hot aqueous ethanolic oxalic acid. There was obtained 21-n-butyl-17β-hydroxy-17α-pregn-4-en-20-yn-3-one, which crystallised from ether/light petroleum in prisms, M.P. 80° to 81° C., [α]$_D^{21}$ +2° (c, 1.0 in ethanol).

EXAMPLE 5

*21-methyl-19-nor-17α-pregna-1:3:5(10)-trien-20-yne-3:17β-diol*

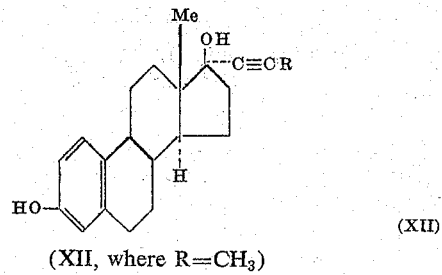

(XII, where R=CH$_3$)

19-nor-17α-pregna-1:3:5(10)-trien-20-yne-3:17β - diol (2 g.) in dry tetrahydrofuran (17 ml.) and 2:3-dihydropyran (5 ml.) was treated with phosphorus oxychloride (0.04 ml.). After 2½ hours at room temperature, the mixture was treated with an excess of very dilute aqueous sodium bicarbonate and the product isolated with ether. Crystallised from aqueous acetone containing a trace of pyridine, the 3:17β-bis-tetrahydropyranyl ether of 19-nor-17α-pregna-1:3:5(10)-trien-20-yne-3:17β-diol formed needles, M.P. 155° to 157° C.

The foregoing compound (1 g.) in dry ether (30 ml.) was added over 30 minutes to a stirred solution of ferric nitrate (0.05 g.) and lithium (0.2 g.) in liquid ammonia (50 ml.) maintained at a temperature just below the boiling point. The mixture was stirred for 2½ hours, methyl iodide (3 ml.) in ether (10 ml.) added over 30 minutes, and the stirring continued for a further 3 hours. Ammonium chloride was added, and the ammonia allowed to evaporate. The product, isolated with ether, was heated under reflux for 30 minutes with toluene-p-sulphonic acid (100 mg.) in ethanol (12 ml.). Chromatography of the product gave 21-methyl-19-nor-17α-pregna-1:3:5(10)-trien-20-yne-3:17β-diol which crystallised (as a monohydrate) from aqueous methanol, in plates, M.P. 110° C., $[\alpha]_D^{23}$ +3° (c, 0.37 in chlorofrm).

EXAMPLE 6

*21-ethyl-19-nor-17α-pregna-1:3:5(10)-trien-20-yne-3:17β-diol*

(Formula XII, where R=$C_2H_5$)

The above compound was prepared by the procedure described in Example 5, ethyl iodide being employed in place of methyl iodide at the alkylation stage. When crystallised from aqueous methanol, the compound separated as a monohydrate, prisms, M.P. 80° C., $[\alpha]_D^{23}$ −1° (c, 0.45 in chloroform).

EXAMPLE 7

*21-n-propyl-19-nor-17α-pregna-1:3:5(10)-trien-20-yne-3:17β-diol*

(Formula XII, where R=n-propyl)

The above compound was prepared by the procedure described in Example 5, n-propyl iodide being used in place of methyl iodide at the alkylation stage. Purified from ether/hexane, the compound formed needles, M.P. 107° to 108° C., $[\alpha]_D^{21}$ −5° (c, 0.33 in chloroform).

EXAMPLE 8

*21-n-butyl-19-nor-17α-pregna-1:3:5(10)-trien-20-yne-3:17β-diol*

(Formula XII, where R=n-butyl)

The above compound was prepared by the procedure described in Example 5, n-butyl iodide being used in place of methyl iodide at the alkylation stage. The compound crystallised from ether/hexane, in needles, M.P. 98° C., $[\alpha]_D^{22}$ −3° (c, 0.32 in chloroform).

EXAMPLE 9

*6α:21-dimethyl-17β-hydroxy-17α-pregn-4-en-20-yn-3-one*

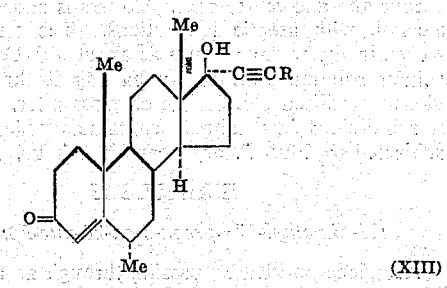

(XIII, where R=$CH_3$)

A suspension of 6β-methyl-17α-pregn-20-yne-3β:5α:17β-triol (1.2 g.) prepared, for example, by the process set forth in copending application Serial No. 587,447, filed May 28, 1956 in dry ether (100 ml.) and 2:3-dihydropyran (2 ml.) was treated with phosphorus oxychloride (5 drops). After 1 hour, the homogeneous solution was washed with dilute aqueous sodium bicarbonate, water, dried, and the solvent removed under reduced pressure. The residue (2.15 g.) consisted of a clear gum, and was used without further purification for the next stage of the process.

The foregoing product (10 g.) in dry ether (150 ml.) was added dropwise over ¾ hour to a stirred solution of ferric nitrate (0.4 g.) and lithium (2.4 g.) in liquid ammonia maintained at a temperature between −30° C. and −40° C. After stirring for a further 2½ hours, a solution of methyl iodide (21 ml.) in dry ether (100 ml.) was added over 30 minutes and the stirring continued thereafter for a further 3 hours. Ammonium chloride (20 g.) was added to the mixture, and the ammonia allowed to evaporate. The product was isolated with ether and obtained as a gum. 9.2 g. of the product was heated under reflux for 1 hour with oxalic acid dihydrate (10 g.) in methanol (100 ml.) and water (10 ml.) The crystalline product obtained on concentrating the solution under reduced pressure was purified from aqueous ethanol to give 6β:21-dimethyl-17α-pregn-20-yne-3β:5α:17β-triol in needles, M.P. 219° to 221° C. decomp., $[\alpha]_D^{21}$ −63° (c, 0.88 in chloroform).

A solution of the foregoing triol (3.4 g.) in pyridine (35 ml.) was added to a solution of chromium trioxide (3 g.) in pyridine (30 ml.) and the mixture allowed to stand overnight. The product, isolated with benzene, was crystallied from acetone/hexane to give 5α:17β-dihydroxy-6β:21-dimethyl-17α-pregn-20-yn-3-one in needles, M.P. 248° to 250° decomp., $[\alpha]_D^{25}$ −45° (c, 0.82 in chloroform).

A solution of the foregoing ketone (1.5 g.) in ethanol (45 ml.) containing concentrated hydrochloric acid (4 drops) was refluxed for 1 hour. The product obtained on the addition of water was purified from aqueous methanol. 6α:21-dimethyl-17β-hydroxy-17α-pregn-4-en-20-yn-3-one formed plates, M.P. 99° to 102° C. [Found: C, 77.2; H, 9.6. $C_{23}H_{32}O_2.H_2O$ requires C, 77.1; H, 9.6%. M.P. 88 to 92° C. after drying for 6 hours at 0.1 mm. and 80° C. (loss in weight: Found, 5.1. $C_{23}H_{32}O_2.H_2O$ requires 5.05%)], $[\alpha]_D^{24}$ +10° (c, 1.03 in chloroform), $\lambda_{max.}$ 241 mμ, log ε 4.16 (in alcohol).

EXAMPLE 10

*21-ethyl-17β-hydroxy-6α-methyl-17α-pregn-4-en-20-yn-3-one*

(Formula XIII, where R=ethyl)

To a suspension of 6β-methyl-17α-pregn-20-yne-3β:5α:17β-triol (10 g.) in dry ether (550 ml.) containing 2:3-dihydropyran (16 ml.) was added phosphorus oxychloride (0.5 ml.). After 3 hours at room temperature, the homogeneous solution was washed with dilute aqueous potassium bicarbonate, water, dried over anhydrous sodium sulphate and evaporated to dryness under reduced pressure. The residue (17 g.), a clear gum, in dry ether (200 ml.) and tetrahydrofuran (50 ml.) was added dropwise over ¾ hour to a suspension of lithamide (from 3.6 g. of lithium) in liquid ammonia (600 ml.) containing ferric nitrate (0.6 g.). After stirring for a further 2½ hours at −30° to −40° C., a solution of ethyl iodide (30 ml.) in dry ether (150 ml.) was added over ½ hour and the mixture was stirred for a further 3 hours at the same temperature. Ammonium chloride (20 g.) was added and the ammonia was allowed to evaporate. Water and ether were added to the residue, the organic layer was separated, washed with dilute sulphuric acid, dilute aqueous potassium bicarbonate, water, dried over anhydrous sodium sulphate and the solvent removed under reduced pressure. The residue (16.6 g.) in methanol (150 ml.) and water (15 ml.) was refluxed with oxalic acid (15 g.) for 1 hour. The resulting solution was concentrated under reduced pressure, diluted with water and extracted with ether. The extract was washed with water, dried over anhydrous sodium sulphate and evaporated to dryness under reduced pressure. Crystallisation of the residual gum from aqueous methanol gave 21-ethyl-6β-methyl-17α-pregn-20-yne-3β:5α:17β - triol as needles, M.P. 168° to 170° C. or 110° to 112° C. (dimorphous forms), $[\alpha]_D^{20}$ —66.2° (c, 0.72 in chloroform).

A solution of the foregoing triol (6.7 g.) in pyridine (70 ml.) was added to one of chromium trioxide (6 g.) in pyridine (60 ml.). The mixture was stirred for 2 hours at room temperature and was then allowed to stand overnight at the same temperature. The product was isolated with benzene and crystallised from aqueous methanol to give 5α:17β-dihydroxy-21-ethyl-6β-methyl-17α-pregn-20-yn-3-one as needles, M.P. 225° to 227° C., $[\alpha]_D^{18}$ —44.5° (c, 0.892 in chloroform).

A solution of the foregoing ketone (1.5 g.) in ethanol (45 ml.) containing concentrated hydrochloric acid (4 drops) was refluxed for 1 hour. Concentration of the solution under reduced pressure followed by dilution with water gave a gum which was extracted into ether. The extract was washed with dilute aqueous sodium bicarbonate, water, dried over anhydrous sodium sulphate and evaporated to dryness under reduced pressure. Crystallisation of the residual gum from aqueous methanol gave 21-ethyl-17β-hydroxy-6α-methyl-17α-pregn-4-en-20-yn-3-one as laths, M.P. 74° to 76° C. [Found: C, 77.7; H, 9.95. $C_{24}H_{34}O_2.H_2O$ requires C, 77.35; H, 9.75%. M.P. 70° to 73° C. after drying for 7 hours at 0.1 mm. and 55° C. (loss in weight: Found: 4.95. $C_{24}H_{34}O_2.H_2O$ requires 4.85%], $[\alpha]_D^{22}$ + 17.2° (c, 1.02 in chloroform), $\lambda_{max.}$ 241 mμ, log ε 4.18 (in alcohol).

EXAMPLE 11

*21-n-propyl-17β-hydroxy-6α-methyl-17α-pregn-4-en-20-yn-3-one*

The 3β:5α:17β-tri(tetrahydropyranyl)-ether of 6β-methyl-17α-pregn-20-yne-3β:5α:17β-triol (10 g.) was prepared as in Example 10. A solution of the crude product in dry ether (150 ml.) and tetrahydrofuran (50 ml.) was added over ½ hour to a suspension of lithamide (from 3.6 g. of lithium) in liquid ammonia (600 ml.) containing ferric nitrate (0.6 g.) and the mixture was stirred for a further 2 hours at —30° to —40° C. A solution of n-propyl iodide (30 ml.) in dry ether (150 ml.) was added over ½ hour and the reaction mixture was stirred for a further 3 hours at the same temperature. The crude product, isolated with ether, was refluxed for 1 hour in methanol (150 ml.) and water (15 ml.) containing oxalic acid (15 g.). Concentration of the solution under reduced pressure followed by dilution with water gave a gum which was extracted into ether. The ether solution was washed with water, dried over anhydrous sodium sulphate and evaporated under reduced pressure. The gummy product crystallised from aqueous methanol to give 21-n-propyl-6β-methyl-17α-pregn-20-yne-3β:5α:17β-triol as needles, M.P. 177° to 179° C., or 92° to 94° C. (dimorphous forms) $[\alpha]_D^{23}$ —46.9° (c, 0.82 in chloroform).

A solution of the foregoing triol (700 mg.) in pyridine (10 ml.) was added to one of chromium trioxide (0.8 g.) in pyridine (10 ml.) and the mixture was stirred for 1½ hours at room temperature. After standing overnight at the same temperature, the product was isolated from the solution with benzene. Evaporation of the benzene extract left a crystalline residue (M.P. 185° to 194° C.) which on purification from aqueous methanol yielded 6-methyl-21-n-propyl-3-oxo-17α-pregn-20-yne-5α:17β-diol in blades, M.P. 176° to 178° C., $[\alpha]_D^{22}$ —40.7° (c, 0.78 in chloroform). This was dissolved in methanol (25 ml.) containing concentrated hydrochloric acid (2 drops) and the solution was refluxed for 1 hour. Concentration under reduced pressure followed by dilution with water gave a gum which was chromatographed on alumina in benzene solution. Elution with benzene gave a gummy fraction which, after crystallisation from aqueous methanol, afforded 21-n-propyl-17β-hydroxy-6α-methyl-17α-pregn-4-en-20-yn-3-one as needles, M.P. 107° to 109° C., $[\alpha]_D^{14}$ —22.3° (c, 0.81 in chloroform), $\lambda_{max.}$ 240 mμ, ε=18,660.

Preparations of certain of the steroidal derivatives hereinabove described may take the form of tablets for oral or sublingual administration, capsules, injections, elixirs or other appropriate pharmaceutical forms. The following examples illustrate some typical formulations which, however, may be varied or modified to an appreciable extent. Thus with a compound for which the preferred basic dose is 0.5 milligram, although much larger doses (e.g. at least 2.5 milligrams) or smaller doses may be given if desired, the following types of preparations may serve to illustrate typical formulations:

EXAMPLE 12

*Tablets*

| | Mg. |
|---|---|
| 21-ethyl - 17β - hydroxy-6α-methyl-17α-pregn-4-en-20-yn-3-one | 0.5 |
| Lactose | 83.0 |
| Magnesium stearate | 1.0 |

Maize starch (as 10 percent paste), a sufficient quantity.
Dried maize starch, sufficient to produce 98.0 mg.

The first two ingredients are mixed and granulated with starch paste followed by drying at 50° C. The resultant granules are processed through a 20 mesh sieve and the lubricant (magnesium stearate) added, together with sufficient dried starch to produce the required weight. Tablets each weighing 97 mg. are compressed from this mixture.

EXAMPLE 13

*Capsules*

| | Mg. |
|---|---|
| 21-ethyl - 17β - hydroxy-6α-methyl-17α-pregn-4-en-20-yn-3-one | 0.5 |

Lactose, a sufficient quantity.

0.5 mg. of the finely subdivided steroid is triturated with lactose to produce a volume of powder which just fills a two piece hard gelatin capsule.

EXAMPLE 14

*Parenteral solution in oil*

| | Mg. |
|---|---|
| 21-ethyl - 17β - hydroxy-6α-methyl-17α-pregn-4-en-20-yn-3-one | 0.5 |
| Benzyl alcohol | 0.05 |

Ethyl oleate (or a suitable fixed oil), sufficient to produce 1.0 ml.

The ethyl oleate is sterilised by heating at 160° C. for 1 hour and allowed to cool. To this is added the benzyl alcohol, with aseptic precautions. The steroid is dissolved in the warm mixture at about 50° C. and the resultant solution clarified by passing it through a previously sterilised No. 2 sintered glass filter. The filtrate is sub-divided into suitable containers which are finally subjected to 100° C. dry heat for 1 hour.

EXAMPLE 15

*6:21-dimethyl-17α-pregn-5-en-20-yne-3β:17β-diol*

Acetylene purified by passing through an acetone/$CO_2$ trap and two wash bottles containing concentrated $H_2SO_4$ was bubbled through dry ether (100 ml.) in a 1 litre flask fitted with a Hg sealed stirrer for 30 minutes. A solution of potassium (2 g.) in tert.-amyl alcohol (30 ml.) (dried by standing over calcium sulphate and distillation over potassium) and 6-methyldehydroepiandrosterone acetate (2 g.) in dry ether (100 ml.) and dry benzene (10 ml.) was added dropwise over 30 minutes and stirring continued for 5 hours, acetylene being bubbled through continuously.

The reaction mixture was acidified with saturated ammonium chloride solution containing a little hydrochloric acid and the product isolated with ether. Crude 6-methyl-17α-pregn-5-en-20-yne-3β:17β-diol was obtained as a solid of M.P. 190 to 194° C. Purification from a small volume of methanol gave plates, M.P. 203 to 207° C.

The foregoing diol in dry tertahydrofuran (10 ml.) and 2:3-dihydropyran (3 ml.) was treated with phosphorus oxychloride (0.02 ml.). The mixture was stored overnight at room temperature and then poured into water (300 ml.) containing a little dissolved sodium bicarbonate. The oil thus obtained was isolated with ether and recrystallised from acetone containing a trace of pyridine. The bistetrahydropyranyl ether of 6-methyl-17α-pregn-5-en-20-yne-3β:17β-diol was obtained as fine needles, M.P. 178 to 180° C. $[\alpha]_D^{20}$ —122.2° (c, 0.450 in chloroform).

The bis-tetrahydropyranyl ether of 6-methyl-17α-pregn-5-en-20-yne-3β:17β-diol (700 mg.) in dry ether (40 ml.) was added to a stirred suspension of lithamide prepared from lithium (400 mg.) in liquid ammonia (75 ml.) (with 50 mg. ferric nitrate added) at —35 to —40° C. After stirring 2¼ hours methyl iodide (2.5 ml.) in ether (15 ml.) was added over 25 minutes and stirring continued thereafter for a further 3 hours. Excess lithamide was decomposed by means of ammonium chloride and the ammonia allowed to evaporate overnight. The product was isolated with ether. Crystallisation from aqueous acetone containing at trace of pyridine gave the hydrate of the bis-tetrahydropyranyl ether of 6:21-dimethyl-17α-pregn-5-en-20-yne-3β:17β-diol as needles, M.P. 160 to 161° C. $[\alpha]_D^{24}$ —117.0° (c, 0.282 in chloroform).

The bis-tetrahydropyranyl ether of 6:21-dimethyl-17α-pregn-5-en-20-yne-3β:17β-diol dissolved in ethanol (100 ml.) was treated at the boil with a hot solution of oxalic acid dihydrate (1.4 g.) in water (50 ml.) and the boiling continued for 1 hour. Diluting to turbidity and long standing gave 6:21-dimethyl-17α-pregn-5-en-20-yne-3β:17β-diol as needles, M.P. 164° or M.P. 111 to 112° C., $[\alpha]_D^{22}$ —102.6° (c, 0.604 in chloroform).

EXAMPLE 16

*Pharmaceutical preparations from 6α:21-dimethyl-17β-hydroxy-17α-pregn-4-en-20-yn-3-one*

Preparations of 6α:21-dimethyl-17β-hydroxy-17α-pregn-4-en-20-yn-3-one, the preferred basic dose of which is 5 milligrams, may take the form of tablets, capsules, powders, or other convenient pharmaceutical forms for oral administration. It will be appreciated by those skilled in the art that the following have been given by way of illustration only and that variations may be made without departing from the invention.

| Tablets | Mg. |
|---|---|
| 6α:21-dimethyl - 17β - hydroxy-17α-pregn-4-en-20-yn-3-one | 5 |
| Lactose | 81.4 |
| Magnesium stearate | 0.972 |
| Maize starch, to 97.2 mg. | |

The first two ingredients are mixed and granulated with 10% starch paste followed by drying at 50° C. The resultant granules are processed through a 20 mesh sieve and the lubricant (magnesium stearate) added, together with sufficient dried starch to produce the required weight.

Tablets each weighing 97.2 mg. are compressed from this mixture.

| Capsules | Mg. |
|---|---|
| 6α:21 - dimethyl-17β-hydroxy-17α-pregn-4-en-20-yn-3-one | 5 |
| Lactose, a sufficient quantity. | |

5 mg. of the finely subdivided steroid hormone is triturated with lactose to produce a volume of powder which just fills a two piece hard gelatin capsule.

We claim:

1. 6β:21-dimethyl-17α-pregn-20-yne-3β:5α:17β-triol.

2. 5α:17β-dihydroxy-6β:21-dimethyl - 17α - pregn-20-yn-3-one.

3. 21-ethyl-6β-methyl - 17α - pregn-20-yne-3β:5α:17β-triol.

4. 5α:17β-dihydroxy-21-ethyl-6β-methyl - 17α - pregn-20-yn-3-one.

5. 6:21-dimethyl-17α-pregn-5-en-20-yne-3β:17β-diol.

6. 6α:21-dimethyl-17β-hydroxy - 17α - pregn-4-en-20-yn-3-one.

7. 21-ethyl-17β-hydroxy-6α-methyl - 17α - pregn-4-en-20-yn-3-one.

8. A therapeutic composition in dosage unit form having progestational properties, comprising 21-ethyl-17β-hydroxy-6α-methyl-17α-pregn-4-en-20-yn-3-one and at least one member selected from the group consisting of a sugar, starch, and magnesium stearate.

9. A therapeutic composition in dosage unit form having progestational properties, comprising 6α:21-dimethyl-17β-hydroxy-17α-pregn-4-en-20-yn-3-one and at least one member selected from the group consisting of a sugar, starch and magnesium stearate.

10. A process for the preparation of 21-alkyl derivatives of 17β-hydroxy-17α-pregn-20-ynes which process comprises condensing a 17β-hydroxy-17α-pregn-20-yne with 2:3-dihydropyran to give a 17β-tetrahydropyranyl ether, reacting said ether with an amide of an alkali metal in liquid ammonia to provide the corresponding $C_{21}$ alkali metal derivative of said ether, condensing said alkali metal derivative with an alkyl derivative selected from the group consisting of alkyl chlorides, bromides, iodides and sulfates to provide the corresponding $C_{21}$-alkylated tetrahydropyranyl ether, and hydrolizing the product by treatment with a source of hydrogen ions to regenerate the 17β-hydroxyl group.

11. A process for the preparation of a 21-alkyl derivative of 17β-hydroxy-17α-pregn-20-yn-3-one, comprising ketalizing a 17β-hydroxy-17α-pregn-20-yn-3-one to provide the corresponding 3:3-ethylenedioxy derivative, condensing said 3:3-ethylenedioxy derivative with 2:3-dihydropyran to provide a 17β-tetrahydropyranyl ether of said 3:3-ethylenedioxy derivative, reacting said ether with an amide of an alkali metal in liquid ammonia to yield the corresponding $C_{21}$-alkali metal derivative of said ether, condensing said alkali metal derivative with an alkyl derivative selected from the group consisting of alkyl chlorides, bromides, iodides and sulfates to provide a 21-alkylated 17β-tetrahydropyranyl ether and treating said 21-alkylated 17β-tetrahydropyranyl ether with dilute ethanolic oxalic acid to regenerate the 17β-hydroxyl group and the 3-oxo group.

12. 21-alkyl derivatives of 17β-hydroxy-17α-pregn-20-yne having the general formula

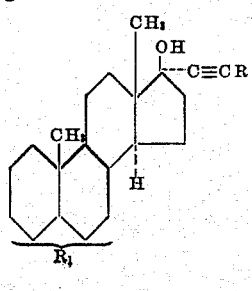

where R is an alkyl group containing from 1 to 4 carbon atoms, and $R_1$ is selected from the group consisting of
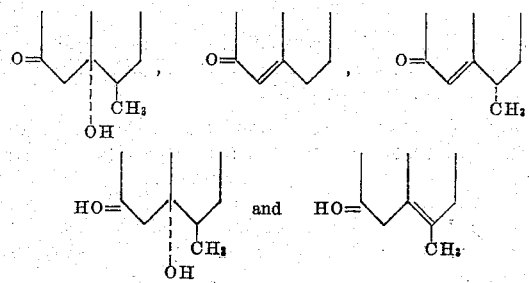
References Cited in the file of this patent
UNITED STATES PATENTS
| | | |
|---|---|---|
| 2,276,547 | Ruzicka | Mar. 17, 1942 |
| 2,280,236 | Inhoffen et al. | Apr. 21, 1942 |
| 2,318,105 | Ruzicka | May 4, 1943 |
| 2,843,609 | Colton | July 15, 1958 |
| 2,845,381 | Tindall | July 29, 1958 |

UNITED STATES PATENT OFFICE
Certificate of Correction

Patent No. 2,939,819            June 7, 1960

Suzanne Patricia Barton et al.

It is hereby certified that error appears in the above numbered patent requiring correction and that the said Letters Patent should read as corrected below.

Column 2, lines 53 to 63, Formula (II) should appear as shown below instead of as in the patent:

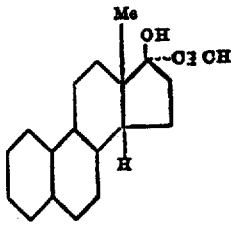

column 3, lines 34 to 44, Formula (IV) should appear as shown below instead of as in the patent:

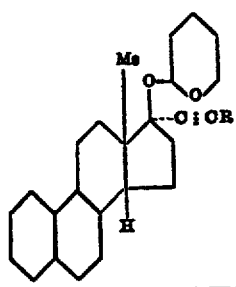

column 5, line 61, for "EAMPLE" read —EXAMPLE—; line 62, for "-ethyl-", read — -methyl- —; same column 5, lines 65 to 74, Formula (XI) should appear as shown below instead of as in the patent:

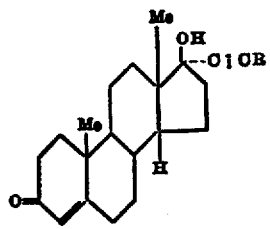

column 15, lines 8 to 14, the last two groups should appear as shown below instead of as in the patent:

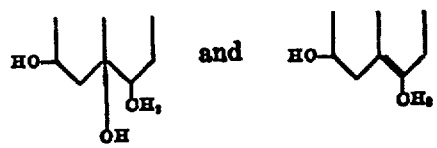

Signed and sealed this 13th day of June 1961.

[SEAL]

Attest:
ERNEST W. SWIDER,
*Attesting Officer.*

DAVID L. LADD,
*Commissioner of Patents.*